A. G. ELLIOTT.
PIPE CLIP.
APPLICATION FILED NOV. 20, 1917.
1,277,398.
Patented Sept. 3, 1918.
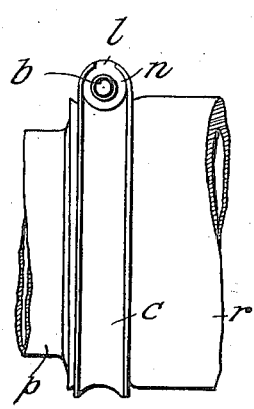
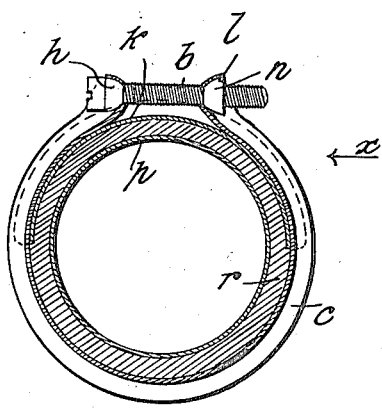
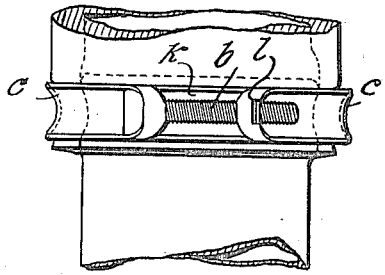
Inventor
Albert George Elliott
by his Attorney

UNITED STATES PATENT OFFICE.

ALBERT GEORGE ELLIOTT, OF DERBY, ENGLAND, ASSIGNOR TO ROLLS-ROYCE LIMITED, OF DERBY, ENGLAND.

PIPE-CLIP.

1,277,398.　　　　Specification of Letters Patent.　　Patented Sept. 3, 1918.

Application filed November 20, 1917. Serial No. 203,029.

*To all whom it may concern:*

Be it known that I, ALBERT GEORGE ELLIOTT, a subject of the King of Great Britain and Ireland, residing at Derby, in England, have invented certain new and useful Improvements in Pipe-Clips, of which the following is a specification.

The present invention relates to an improved pipe clip for securing a rubber tube or other flexible connection to a metal pipe. A usual form of clip consists of a piece of flat metal shaped to encircle the flexible connection and having its ends bent outward radially, through which a tightening bolt or its equivalent is inserted. The action of tightening this bolt distorts both lugs and bolt, imposing a comparatively large bending moment on both the lugs and the bolt.

The object of my invention is to reduce to a minimum the bending moment on the lugs and the clip, and to eliminate bending stresses on the bolt or its equivalent. A further object is to increase the pressure per unit area exerted by the clip upon the rubber tube and by the rubber tube upon the metal pipe, thus increasing the tightness of the joint. A further object is to provide a lighter construction of clip than has hitherto been available.

These objects are attained by forming the undersides or contact surfaces of the bolt head and nut semispherical in shape, or to a suitable arc of a sphere, and by arranging upon the band of the clip corresponding spherical seatings for the bolt head and nut. Thus, the bolt is not subjected to any stresses other than tension when the clip is tightened up, and the bolt may be brought closer to the tube than has hitherto been possible. The band of the clip is pressed from sheet metal, its cross section being made to a circular arc, or being otherwise suitably curved. This cross section lends itself to the formation of lugs at the ends of the band with spherical seatings for the bolthead and nut, and gives a strong and light construction.

The accompanying drawing illustrates the invention, the clip being shown tightened up in place upon a metal pipe and rubber tube.

Figure 1 is a transverse section of Fig. 2. Fig. 2 is a side elevation in the direction of the arrow $x$. Fig. 3 is a plan view of Fig. 1.

The band $c$ of the clip is pressed from sheet metal its cross section being made to a circular arc. This shape of cross-section is such that when the clip is tightened up, the middle of the band sinks into the rubber tube $r$, and the pressure per unit of area between the rubber tube and the metal pipe $p$ is greater than with the usual flat band, and the tightness of the joint is increased. Also the absence of sharp edges on the curved surface of the band in contact with the rubber tube obviates the possibility of damage to the rubber tube in tightening up the clip. The bolt $b$ has the contact surface of its head $h$ formed to a semisphere or to a suitable arc of a sphere, the contact surface of the nut $n$ is similarly shaped, and the ends of the band $c$ are pressed into the form of lugs or spherical seatings to accommodate the bolt head and nut. The bolt is thus free from all stress other than tension. The bolt head $h$ is slotted to receive a screw driver for tightening or slacking the clip. Means are provided for preventing either the nut or the bolt from turning while the other is being turned. In the drawings, the nut $n$ has a small lug $l$ formed integral with it and engaging with a recess or slot in the band $c$. A metal packing strip $k$ of similar cross section to the band assists in distributing the pressure exerted by the clip evenly around the rubber tube in the vicinity of the ends of the band. The metal pipe is preferably formed with a groove or recess, as shown dotted in Fig. 3, for the purpose of locating more securely the rubber tube upon the metal pipe.

The section of the band as above described renders it possible to make the lugs at its ends of a shape best suited to resist deformation when the clip is tightened up. A further advantage of this construction is that the bolt may be arranged very close to the rubber tube around which the clip is placed, the combination of band and bolt deviating a minimum amount from the form of a circle. Consequently, the invention approaches as nearly as possible to the ideal shape for a pipe clip, that is, one in which the tightening or contracting mechanism causes a minimum distortion of its circular form.

What I claim as my invention and desire to secure by Letters Patent of the United States is:—

A clip for securing a tube of yielding material to a metal pipe, comprising a sheet metal band adapted to encircle the tube and having its ends turned outward and formed with centrally-apertured spherical seats which face each other; a bolt passed through the apertures in said seats and having the under side of its head made spherical so as to conformably fit in the adjacent seat; and a nut threaded on said bolt and having a spherical under side adapted to conformably fit in the other seat; said other seat being formed with a recess and said nut having an integral lug adapted to engage in said recess to prevent the nut from turning when the bolt is being turned.

In witness whereof I have signed this specification in the presence of two witnesses.

ALBERT GEORGE ELLIOTT.

Witnesses:
  NORAH H. WOLVERSON,
  F. H. ROYCE.